Oct. 10, 1933.  R. O. HAMILL  1,929,421
AUTOMATIC DISCONNECTER
Filed June 20, 1930
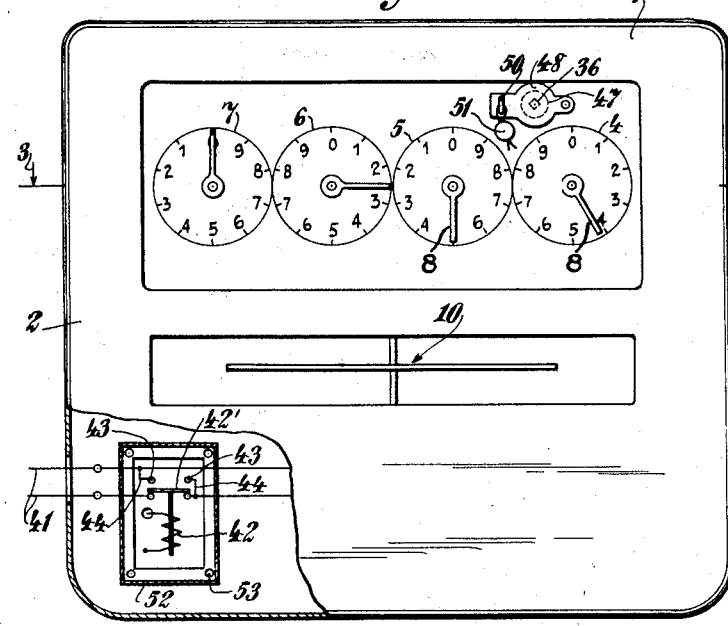
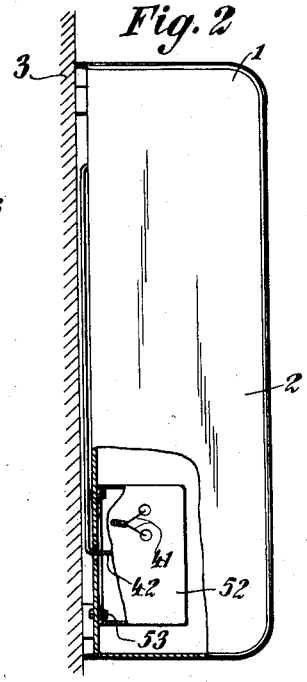
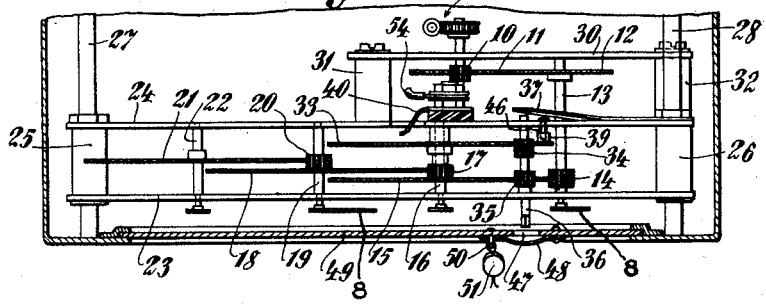
INVENTOR
R. O. Hamill
BY Edward R. Hathaway
ATTORNEY Patented Oct. 10, 1933

1,929,421

UNITED STATES PATENT OFFICE 1,929,421

AUTOMATIC DISCONNECTER

Ret O. Hamill, Brooklyn, N. Y., assignor of one-third to Arthur Autler and one-third to Grover Autler, both of New York, N. Y.

Application June 20, 1930. Serial No. 462,446

13 Claims. (Cl. 171—34)

This invention relates generally to means for automatically controlling a metered circuit and more particularly to an automatic electric service disconnecter.

In the distribution of electricity, each customer is provided with a meter for determining what quantity of current he has used. These meters are usually placed in rather remote locations of the dwelling, building, or other structure, such as machine shops or other industrial plants. As a result, if the customer does not pay his bills when due or after a given warning, it is necessary for the service man to gain access to the building in order to disconnect the service wires and thereby prevent the customer from using further current. A delinquent customer, however, and especially a habitual delinquent, will usually take care to see that all means of access to the building are closed so as to prevent entry, or materially interfere with entry, of the service man to disconnect the service. To get around such difficulties, it is usually necessary to instigate legal proceedings by which the service may be disconnected.

With my improved arrangement, the service is automatically disconnected after a predetermined amount of current has been used, and after being so disconnected, the customer cannot himself, without breaking a seal or literally destroying the meter equipment, reconnect his service, as the equipment is so arranged that it requires the breaking of a seal by an authorized party and the resetting of the equipment by him. After such a resetting operation, the instrument would again be sealed.

In order to allow a customer to use a given amount of current before being shut off, the instrument may be arranged to permit different amounts of current to be served to the customer before automatically disconnecting him. This quantity of current is usually gauged so that the customer is disconnected when he owes a certain amount in dollars and cents. This amount is such that generally the meter man will come to read the meter before the full amount is used at which time he can reset the instrument so as to permit the customer to have another given value's worth of current without the possibility of being disconnected. The instrument is not of course reset by the meter man unless the customer has paid his previous bill. In case the customer becomes delinquent, the meter man is given instructions not to reset the instrument, and the bill forwarded to the customer will contain a sufficient notice that the current will be automatically cut off when current to a certain value in dollars and cents has been used. This notice to the customer, with knowledge that he is unable to prevent the disconnecting of his service as by barring the doors to his building, will act as a very decided stimulant to make haste in settling his account.

It is, therefore, an object of my invention to provide an improved automatic control for a metered circuit. A further object is to provide improved means whereby the automatic control may be reset while a still further object in this respect is to permit resetting without in any way changing or interfering with the reading of the meter. A still further object is to provide relatively simple means for effecting the resetting operation and to have such means so constructed and arranged whereby no appreciable increase in friction of the meter will be effected.

Still another object of the invention is to provide a relatively simple arrangement which may be readily applied to the standard meters now on the market or that may be designed in the future.

A further object is to provide an improved relay control of the service wires, thereby reducing the amount of current which is necessary to pass through the automatic contacts.

Another object is, if desired, to have the relay and the relay wires so arranged with respect to the meter that it is impossible for the customer to properly re-establish his service after the same has been disconnected, and in this respect, the relay may be so constructed that in case the customer attempts to shunt around the meter, as when it is disconnected, he will be faced automatically with a short circuit, thereby constantly blowing his fuses whenever he attempts to establish the shunt.

Other objects and advantages will be readily understood by persons skilled in the art and it will also be obvious to such persons that various modifications and changes may be made in the invention from that described in the accompanying drawing, in which:

Fig. 1 is a front elevation of a meter enclosed within a meter pan, part of which is broken away so as to show diagrammatically the relay and automatic short circuit.

Fig. 2 is a side elevation of Fig. 1 with part of the meter pan broken away to show the relay and wiring connection therefor disposed behind the pan.

Fig. 3 is a horizontal transverse section, taken substantially on the line 3—3 of Fig. 1.

Fig. 4 is a partial rear view of the right end of Fig. 3.

Fig. 5 is a partial sectional view, similar to Fig. 3 but showing only the right end thereof, the device being shown in position for the resetting operation.

Fig. 6 is a fragmentary view showing how the automatic disconnecter may be rendered inoperative by the service man in case the customer is no longer on the delinquent list.

Fig. 7 is a modified form of gear arrangement.

Fig. 8 is a modified relay lock.

While I have illustrated my invention in connection with a meter diagrammatically shown and generally indicated at 1, it is of course to be understood that any usual or suitable type of meter may be employed. In any case, it is preferable that the meter be enclosed within a meter pan 2, which is secured to any suitable support, such as a wall 3 of a building.

The meter is of the integrating type having, as is usual, a series of meter dials 4, 5, 6 and 7 corresponding, respectively, to tens, hundreds, thousands and ten-thousands, or any multiple thereof, depending upon the gear reduction for driving the indicating hands 8. The mechanism for actuating the series of hands 8 is well known and accordingly, it will suffice to state briefly that the same comprises a worm and worm gear 9 driven usually from an induction disc motor generally indicated at 10. From the worm gear, power is transmitted in the order named through pinion 10, gears 11 and 12, shaft 13 and pinion 14 secured thereto, gear 15 secured to shaft 16 and pinion 17 also mounted thereon, gear 18 secured to shaft 19 with pinion 20 also mounted thereon, and gear 21 secured to shaft 22. Through this arrangement, it is seen that the indicating hands are mounted upon each of the shafts 13, 16, 19 and 22, thereby metering and recording the total current consumed. The various shafts and gears are supported between vertically disposed front and back plates 23 and 24, which are secured together as by threaded hollow bushings 25 and 26. These bushings are disposed on suitable rods 27 and 28, whereby the dial mechanism may be bodily removed from the meter without disturbing the actuating motor or the remainder of the equipment. A further plate 30 is supported by the rear plate 24 as by spacing bushings 31 and 32 these also being bodily removable with the dial mechanism.

My improved automatic means comprises a gear 33 loosely journaled upon shaft 16 or any other shaft which might be desired depending upon the amount of current to be allowed before automatically disconnecting the service. This gear is identical to gear 15, so that by the provision of double pinions 34 and 35 each rigidly secured to a shaft 36 which is journaled in plates 23 and 24 and respectively meshing with gears 15 and 33, gear 33 will rotate with gear 15 during operation of the meter. With the freely journaled gear 33 positively driven, a contact 39 formed on the side thereof will be rotated around until it engages a suitable stationary contact 40, which may be rigid, or if desired in the form of a flexible spring as shown. In each case the contact is suitably insulated from the dial frame.

Upon closure of contacts 39 and 40 a circuit is established from the main line 41 through a relay coil 42 and there through the meter frame to the other side of the line, thereby causing a normally closed relay contact bar 42' to be moved upwardly, and thus break the service wires. Upon automatic breaking of the service wires, a pair of supplemental contacts 43 may be automatically closed if so desired, thereby making a short circuit as by wires 44 across the service wires on the load side. As a result, if the customer attempts to shunt around the meter, a fuse will immediately be blown due to the short circuit. It is to be noted that this short circuit is so arranged that it does not fall across the supply lines and it will only be brought into action upon tampering with the meter wires. It is also to be noted that this short circuit is rendered inoperative when the service is normally connected.

To reset the instrument double pinion shaft 36 is moved axially in a rearward direction, against the tension of a spring 37, by a suitable key 45 insertable on the squared end of the shaft, whereby pinion 35 is moved out of mesh with gear 15, although pinion 34 remains in mesh with free gear 33. Rotation of the key in the proper direction rotates gear 33 backwardly alone, thereby not disturbing in any way the meter reading.

The extent to which gear 33 is moved back determines the amount of current that can again be metered before causing the automatic disconnecting operation. To definitely determine this value, there is provided an insulated pin 46 secured to the back frame plate 24 and projecting inwardly to provide a stop for the contact 39 when the gear is reset to its starting position. The arcuate distance between the stop pin 46 and contact 40 will determine the amount of current to be metered before closure of contacts 39 and 40 and hence disconnecting of the service. The arcuate distance between stop pin 46 and contact 40 may be measured by the use of a suitable template and a hole for the stop pin drilled accordingly or if desired a series of circularly arranged holes may be drilled in the back plate 24 and the pin inserted in the desired one. After gear 33 is reset, removal of key 45 will permit spring 37 to move pinion 35 into mesh with gear 15 as shown in Fig. 3. The automatic function is then ready for operation it being noted that no additional friction is caused by the spring as normally it is spaced slightly away from the end of shaft 36.

While the free gear 33 is shown as on the shaft of the second dial, it is to be understood that this gear may be disposed on either one of the other shafts. When the gear is on either shaft 19 or 22, the gear will rotate much slower, and hence permit a greater amount of metered current before automatically disconnecting the wires. Inasmuch as the dial mechanism is readily removable from the meter, it is in general preferred to have only a single hole for the stop pin thereby making the instrument suitable for only the given amount of current which it is desired to control automatically. In view of the fact that these amounts will be only two or three in number, it is readily seen that only a few classes of instruments will be necessary.

If the loose gear is disposed on either of the other two shafts 19 or 22, the pinions 34 and 35 will mesh with the gears 18 or 21, which will necessitate having a key opening 47 in the window in alinement with the shaft 36. This opening is covered by a small swingable sealing cap 48 preferably pivoted to the glass plate 49 in front of the dials and adapted to be sealed in any of the usual manners, as by the provision of a staple 50 passing through the cap and a seal 51 extending through the eye. The seal 51 is broken and the cap 48 swung to one side to permit resetting. This resetting operation will take place each time the meter is read unless the customer is delinquent in which case gear 33 will not be disturbed thereby ultimately allowing contact 39 to engage contact 40.

To insure against any attempts by the customer to open the relay circuit after the automatic disconnection, the relay casing 52 is secured to the meter pan as by screws 53 passing through the back of the meter pan from the rear side thereof. The relay wire 42 is also passed through an opening in the back of the meter pan and across the back thereof and into the meter. When the meter pan is secured to the wall, it is seen that it is impossible to have access to the relay wire, or to the relay in any way, unless the equipment is mutilated. Such treatment, however, is not likely, and hence it will be seen that an extremely effective method is provided for automatically disconnecting the service in case the customer becomes delinquent, and at the same time, the instrument may be quickly and easily reset so as not to cut off the customer in case his bill is paid promptly.

If for any reason it is desired to prevent operation of the automatic feature, a short bushing 55 may be placed on the end of the double pinion shaft 36 and pressed and held inwardly by the sealing cap 48 when sealed and thus disengage gears 35 and 15. Upon such disengagement, the loose gear will not be rotated and hence the automatic feature will not be brought into action.

In certain types of dial registers it may be more convenient to attach the free gear on the outside of the plate 24 instead of between the plates. This would merely necessitate the extension of any of shafts 16, 19 or 22 to provide a journal for the free gear while the pinion 34 would likewise be disposed on the outer end of its shaft 36. Such an arrangement is shown in Fig. 7.

In the modification shown in Fig. 8 the relay box 60 is of the type having a hinged door 61 which when open is large enough to permit access to the relay. This is in distinction to the other form where the relay box is entirely closed and is accessible only from the rear. To prevent opening of the door when the relay switch is opened, there is provided a latch bar 62 secured to and movable with the solenoid core 63. The outer end of this latch has a wedge which, upon raising of the solenoid, moves under a cross bar 64 secured to the inner side of the door. This positively locks the door against opening automatically when the service is disconnected.

While I have shown a preferred form and certain detailed modifications thereof, it will of course be understood that various changes may be made by persons skilled in the art without departing from the spirit of my invention as set forth in the appended claims.

I claim:

1. An automatic electric service disconnecter for use in a post-payment or credit system of electrical distribution wherein meters are periodically read and the current used in any given period is billed to the customer for subsequent payment, comprising, in combination, an integrating watt hour meter adapted to measure the watt hours used in a given circuit, means for breaking said circuit, means for automatically effecting actuation of said circuit breaking means to disconnect said circuit when a predetermined number of watt hours are used, and means whereby said automatic means may be reset by an authorized person such as a meterman after a periodic reading of the meter thereby to permit the customer to use a further predetermined number of unpaid for watt hours.

2. An automatic electric service disconnecter apparatus for use in a post-payment system of electrical distribution comprising, in combination, an integrating watt hour meter having a rotatable element the rotation of which is an indication of the watt hours of current used, relatively movable contacts, means whereby one is moved by said rotatable element, means controlled by said contacts for breaking the metered circuit automatically when a predetermined number of watt hours are used, and resetting means for said contacts constituting at all times a part of said apparatus and having provision so that a meterman or other authorized person may effect a resisting operation before said predetermined number of watt hours are used thereby permitting a customer to be supplied with his predetermined quantity of current from the time of resetting.

3. An automatic electric service disconnecter comprising, in combination, an integrating watt-hour meter having a shaft and a gear for rotating the same the rotation of which is an indication of the watthours of current used, relatively movable contacts for controlling a circuit metered by said watthour meter, and circuit breaking means rendered operative upon engagement of said contacts with each other to break said metered circuit, a gear train meshing with said gear for effecting relative movement between said contacts, and means whereby said gear train is adapted to be disconnected from said gear to effect relative movement between said contacts independently of said gear thereby allowing said contacts to be reset when the reading of said meter remains unchanged.

4. An automatic electric service disconnecter comprising, in combination, an integrating watt-hour meter having a rotatable element, contacts, means adapted to be releasably connected to said element for effecting relative movement between said contacts either by being driven by said element or independently thereof, a circuit metered by said meter, and means rendered operative upon a predetermined relative movement between said contacts for disconnecting said metered circuit whereupon said independent relative movement between said contacts may be effected to reset said contacts without any disturbance of said meter.

5. An automatic electric service disconnecter comprising, in combination, an integrating watt-hour meter having a shaft and a gear for driving the same, a second gear adapted to be substantially freely rotatable relative to said other gear, gears connecting both of said other gears, contacts controlled by said second gear, means whereby relative axial movement may be effected between certain of said gears to break the driving connection therebetween, a circuit metered by said integrating meter, and means whereby upon a predetermined relative movement between said contacts said metered circuit is disconnected whereupon said second gear is adapted to be freely rotated to effect resetting of said contacts so as to permit reestablishment of the metered circuit.

6. An automatic electric service disconnecter comprising, in combination, an integrating meter having a gear train, a gear coaxial with and adapted to be freely rotatable relative to a gear of said train, coaxial pinions meshing with each of said gears whereby the free gear is adapted to be positively driven by said train gear, contacts controlled by said free gear, a circuit metered by said integrating meter, and means rendered operative upon a predetermined position of said contacts for disconnecting said metered circuit whereupon said free gear may be operated independently of said meter for resetting said contacts without disturbing in any way said meter.

7. An automatic electric service disconnecter comprising, in combination, an integrating meter having a gear train, a gear coaxial with and adapted to be freely rotatable relative to a gear of said train, coaxial pinions meshing with each of said gears whereby the free gear is adapted to be positively driven by said train gear, means whereby said pinions are adapted to be axially moved so as to disengage the gear of said train while retaining engagement with said free gear thereby permitting free rotation of said pinions and free gear without actuating said gear train, contacts controlled by said free gear, a circuit metered by said integrating meter, and means rendered operative upon a predetermined position of said contacts for disconnecting said metered circuit whereupon said free gear may be rotated independently of said meter or its gear train for resetting said contacts and thus allow said metered circuit to be reconnected.

8. An automatic electric service disconnecter comprising, in combination, an integrating meter having a gear train, a gear coaxial with and adapted to be freely rotatable relative to a gear of said train, coaxial pinions meshing with each of said gears whereby the free gear is adapted to be positively driven by said train gear, means whereby said pinions are adapted to be axially moved so as to disengage the gear of said train while retaining engagement with said free gear thereby permitting free rotation of said pinions and free gear without actuating said gear train, means for limiting the extent of said free rotation, contacts controlled by said free gear, a circuit metered by said integrating meter, and means rendered operative upon a predetermined position of said contacts for disconnecting said metered circuit whereupon said free gear may be rotated independently of said meter or its gear train for resetting said contacts and thus allow said metered circuit to be reconnected.

9. An automatic electric service disconnecter comprising, in combination, an integrating meter having a gear train, a gear coaxial with and adapted to be freely rotatable relative to a gear of said train, coaxial pinions meshing with each of said gears whereby the free gear is adapted to be positively driven by said train gear, means whereby said pinions are adapted to be axially moved so as to disengage the gear of said train while retaining engagement with said free gear thereby permitting free rotation of said pinions and free gear without actuating said gear train, means for limiting the extent of said free rotation, contacts controlled by said free gear, means for automatically re-engaging said pinions with said gear train upon releasing said pinions from their axially moved position, a circuit metered by said integrating meter, and means rendered operative upon a predetermined position of said contacts for disconnecting said metered circuit whereupon said free gear may be rotated independently of said meter or its gear train for resetting said contacts and thus allow said metered circuit to be reconnected.

10. An automatic electric service disconnecter apparatus comprising, in combination, a metered circuit, means for automatically disconnecting said circuit when a given number of watt hours have been used, and means whereby said automatic means can be reset so as to allow only a predetermined further amount of current to be used by an authorized person at any time so that after the resetting operation a customer can use his full quantity of current but no more even though the customer had not used his full amount.

11. An automatic electric service disconnecter comprising, in combination, an integrating watt hour meter, a circuit metered thereby, means for automatically disconnecting said circuit when a given amount of current flows therethrough, and means whereby said automatic means can be reset or indefinitely retained in an inoperative position while the meter remains in operation.

12. An automatic electric service disconnecter comprising, in combination, a meter adapted to measure the amount of current used in a given circuit, a relay for breaking said circuit, means for automatically actuating said relay when a given amount of current is metered, and means for resetting said automatic means so as to allow only a predetermined further amount of current to be used.

13. An automatic electric service disconnecter comprising, in combination, an integrating meter, a relay and circuit controlled thereby, a meter pan, means for supporting said relay by said pan so as to prevent direct removal from the front thereof, means actuated by said meter for automatically causing said relay to break said circuit when a given amount of current has been metered, and means for resetting said automatic means without affecting the meter reading and allowing only a predetermined amount of current to be used after the resetting operation.

RET O. HAMILL.